Patented Apr. 27, 1971

3,576,858
PREPARATION OF CALCIUM GLUTAMATE
Naomasa Mizoguchi and Tadashi Takeshiro, Tokyo, and Kenkichi Ito, Sagamihara-shi, Japan, assignors to Ajinomoto Co., Inc., Tokyo, Japan
No Drawing. Filed Sept. 8, 1967, Ser. No. 666,449
Claims priority, application Japan, Sept. 12, 1966, 41/59,923
Int. Cl. C07c *101/22*
U.S. Cl. 260—534                      5 Claims

ABSTRACT OF THE DISCLOSURE

Calcium glutamate is prepared from the $\beta$-cyano, $\beta$-carboxy, and $\beta$-carbo-lower-alkoxy derivatives of 5-ethyl-hydantoin by ring fission at 100°–250° C., in the presence of aqueous ammonia, removal of the carbon dioxide thereby liberated, and by heating the residual reaction mixture to an elevated temperature with an equivalent amount of lime until calcium glutamate precipitates and can be recovered.

BACKGROUND OF THE INVENTION

This invention relates to the synthesis of glutamic acid and its salts by way of calcium glutamate, and particularly to the conversion of hydantoin derivatives of the formula:

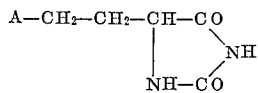

to calcium glutamate, A being cyano, carboxy, or carbo-lower-alkoxy.

It is known to prepare amino acids from corresponding hydantoin derivatives by hydrolysis in concentrated solutions of mineral acids or alkali hydroxide. The excess acid or alkali in the hydrolyzate must be neutralized before the amino acid can be isolated from the aqueous mixture by crystallization. The mother liquor retains much amino acid which cannot readily be separated from the large amount of inorganic salts present.

It has also been proposed to convert hydantoin derivatives to the calcium salts of amino acids by reaction with lime and water at elevated temperature. We have found that this method, as applied to the preparation of calcium glutamate, gives poor yields in open containers but that the yield is greatly increased when the hydrolysis is carried out in closed vessels at pressures of the order of 20 kg. per cm.$^2$ (300 pounds/square inch).

This method, however, is not practical in the manufacture of glutamic acid on an industrial scale. The reaction is heterogeneous, and thus cannot conveniently be performed continuously, as by passing the reactants through a tubular autoclave because the solid materials present tend to obstruct the conduits employed. Moreover, the calcium carbonate formed during the reaction as a fine powder is mixed with the calcium glutamate, is difficult to filter, and even more difficult to separate from the calcium glutamate.

SUMMARY OF THE INVENTION

We have found that calcium glutamate can be produced in practically equivalent amounts from the aforementioned derivatives of 5-ethylhydantoin, by first reacting the hydantoin derivatives with aqueous ammonia in a closed vessel at temperatures above 100° C., until the hydantoin ring is opened and carbon dioxide is developed.

The carbon dioxide is stripped from the reaction mixture so that a subsequent reaction with lime does not produce calcium carbonate. The term lime, as employed hereinafter, and unless otherwise specifically stated, will be understood to cover calcium oxide and the hydration products of the same, more specifically calcium hydroxide. The lime treatment may be performed at any desired temperature and pressure at which the system is liquid.

The ammonia concentration in the first step of our process is not critical. The lower effective limit of ammonia concentration appears to depend on the sensitivity of the method employed for detecting the carbon dioxide developed, and for finding calcium glutamate in the ultimate product. For industrial purposes, amounts of ammonia smaller than 0.1 mole per mole of hydantoin derivative are not practical. A large excess of ammonia, more than 5 moles per mole of hydantoin derivative, is undesirable because a discolored reaction product is obtained. We have not found an upper limit of ammonia concentration at which calcium glutamate would not ultimately be produced at least to some extent. The minimum and maximum values of 0.1 and 5 moles thus merely bracket the range of concentrations presently considered desirable.

The ring fission reaction and the development of carbon dioxide are accelerated by raising the temperature beyond the minimum value of 100° C. Highest yields are obtained between 170° and 200° C. in closed containers, and nothing significant can be achieved by operating at temperatures higher than 200° C. although the method is operative even at a temperature of 250° C. during the hydrolysis of the hydantoin derivative in a liquid aqueous medium containing ammonia.

The carbon dioxide formed in the first reaction step is practically completely stripped from the first reaction mixture when the pressure is released at a sufficiently high temperature.

Lime is preferably reacted with the stripped hydrolyzation mixture in an amount approximately equivalent to the hydantoin derivative present, a small excess being beneficial. Highest yields are obtained with 1.0 to 1.2 moles lime per mole of hydantoin derivative. The yield is reduced proportionally if less than one mole equivalent of lime is provided, but at least some calcium glutamate is obtained in the presence of even minute amounts of lime.

The calculated amount of lime may be added to the stripped hydrolyzation mixture in one batch at the start of the heating operation, or may gradually be added without significantly affecting the results.

The temperature and pressure prevailing during the reaction with lime are not critical but the reaction is too slow below about 50° C. to be economical. The reaction rate increases generally with temperature but we normally prefer not to operate in closed vessels in which reaction temperatures as high as 200° C. may be employed successfully. The reaction proceeds at a good rate at the boiling point of the reaction mixture in an open vessel and is practically complete after 8 to 12 hours. Calcium glutamate is only sparingly soluble in the reaction mixture at any temperature, and forms a precipitate which can be filtered off, or otherwise separated from the mother liquor.

DESCRIPTION OF PREFERRED EMBODIMENTS

The invention is further illustrated by the following examples, but it will be understood that the invention is not limited thereto.

Example 1

Mixtures prepared from 15.3 g. (0.1 mole) 5-($\beta$-cyanoethyl)hydantoin, 80 ml. water, and 6.7 ml. 28% aqueous ammonia solution were respectively heated in a 200 ml. stainless steel autoclave for the periods and to the temperatures listed in Table 1. After the indicated times, the autoclave was cooled to slightly less than 100° C. and opened, whereby the contents were practically completely stripped of carbon dioxide and ammonia.

Each reaction mixture was transferred to a flask equipped with a reflux condenser and boiled for 12 hours after 8.5 g. (0.11 mole) calcium hydroxide had been added. The precipitated calcium glutamate dihydrate was filtered off. The yields of calcium glutamate obtained at the various temperatures and reaction times are listed in the table in percent equivalents of the initial cyanoethylhydantoin.

TABLE 1

Calcium glutamate formed, percent after—

| | 1 hr. | 2 hrs. | 4 hrs. | 5 hrs. | 8 hrs. | 10 hrs. |
|---|---|---|---|---|---|---|
| 90° C | | | | | | 30 |
| 100° C | | | | | | 40 |
| 110° C | | | | 40 | | 50 |
| 120° C | | | | 48 | 58 | |
| 130° C | | | | 50 | 65 | |
| 140° C | | | 55 | 65 | | |
| 150° C | | | 82 | 86 | | 87 |
| 160° C | | 78 | 84 | | | |
| 170° C | | | | | 90 | |
| 180° C | | 83 | 88 | 92 | | |
| 190° C | | 90 | 94 | | | |
| 200° C | | 93 | | | | |

As is evident from Table 1, the rate of reaction between the ammonia and the cyanoethylhydantoin increases with the temperature so that the reaction is practically completed within one hour at 200° C. The higher pressures prevailing at even higher temperatures increase the cost of the equipment to an extent not justified by the relatively minor savings in reaction time.

The expected relationship between the temperature and the rate of reaction is also observed in the second hydrolyzation step in which lime is the hydrolyzing agent. Whereas a yield of 94% is reached in 12 hours under reflux conditions in an open vessel (100° C.) after an initial hydrolysis with ammonia at 190° C. for 2 hours, the yield is only about 80% if the second reaction step is performed at 80° C. for 12 hours, and heating to 80° C. for more than 20 hours is necessary for increasing the yield beyond 90%.

Example 2

A mixture of 15.3 g. (0.1 mole) 5-(β-cyanoethyl)-hydantoin, 0.7 ml. 28% aqueous ammonia (0.01 mole) and 86 ml. water was placed in the afore-mentioned autoclave, which was then sealed and heated for four hours to 180° C. The gases formed (CO₂ and NH₃) were released as above, and the liquid contents of the autoclave were refluxed at ambient pressure for 12 hours with 8.5 g. calcium hydroxide.

The crystalline calcium glutamate dihydrate which precipitated from the liquid was collected by filtration and weighed 20.3 g. (92.0% yield). The yield was unchanged although the amount of ammonia initially employed had been sharply reduced as compared to the operating conditions under which the analogous run indicated in Table 1 was performed.

Example 3

12.2 g. (0.08 mole) 5-(β-cyanoethyl)-hydantoin, 21 ml. (0.32 mole) 28% aqueous ammonia, and 65 ml. water were heated in the aforedescribed autoclave to 190° C. for one hour. After release of carbon dioxide and ammonia, the contents of the autoclave were refluxed with 7.1 g. calcium hydroxide for 10 hours. Crystalline calcium glutamate was recovered thereafter in an amount of 15.9 g. (90% yield).

Example 4

174 g. (1.5 moles) methyl β-formylpropionate, 48.6 g. (1.8 moles) hydrogen cyanide, 173 g. (1.8 moles) ammonium carbonate, 300 ml. 28% aqueous ammonia (4.5 moles), and 700 ml. water were placed in a stainless steel autoclave of 2 liter capacity, and the mixture was heated to 120° C. for 30 minutes to form 5-(β-carbomethoxyethyl)-hydantoin in the reaction mixture.

The mixture, which still contained free ammonia, was heated to 190° C. for two hours, and the gaseous carbon dioxide and ammonia present in the vessel were released. The liquid contents of the autoclave were refluxed with 133 g. calcium hydroxide for 12 hours at ambient pressure, cooled and filtered. 311 g. calcium glutamate were collected on the filter (94% yield based on the methyl β-formylpropionate originally present).

Example 5

A mixture of 8.3 g. (0.1 mole) β-cyanopropionaldehyde, 29.7 g. (1.1 mole) hydrogen cyanide, 14.4 (0.15 mole) ammonium carbonate, 30 ml. (0.45 mole) 28% aqueous ammonia, and 60 ml. water was heated to 120° C. in a 200 ml. autoclave for 20 minutes. The reaction mixture, which contained 5-(β-cyanoethyl)-hydantoin, was further heated to 160° C. for two hours, whereupon the gaseous carbon dioxide and ammonia were released, and the liquid residue was refluxed at ambient temperature with 8.5 g. calcium hydroxide for 8 hours.

The crystalline calcium glutamate collected from the reaction mixture by filtration weighed 18.5 g. (83.5% yield).

Example 6

A mixture of 30.6 g. (0.3 mole) β-formylpropionic acid, 8.9 g. (0.33 mole) hydrogen cyanide, 34.6 g. (0.36 mole) ammonium carbonate, 100 ml. 28% aqueous ammonia solution (1.5 mole NH₃), and 150 ml. water was heated in a 500 ml. stainless steel autoclave to 120° C. for 15 minutes. The reaction mixture now containing 5-(β-carboxyethyl)-hydantoin was additionally heated to 200° C. for one hour.

After release of carbon dioxide and ammonia from the autoclave, its liquid contents were refluxed with 22.6 g. lime (0.36 mole) for eight hours. The yield of calcium glutamate, which was recovered as in the preceding examples, was 61.7 g. (93.0%).

The ethyl and other lower alkyl esters of β-formylpropionic acid are similarly converted to calcium glutamate in almost 100% yields without isolation of the 5-(β-carboalkoxyethyl)-hydantoins. The 5-ethylhydantoin derivatives may be isolated as crystals from the reaction mixtures of Examples 4 to 6 by concentration prior to heating to a temperature between 170° and 200° C.

The first stage of hydrolyzation reaction, in which ammonia is the hydrolyzing agent, is performed in a homogeneous system and can readily be made continuous. The only solid material present in the second stage is calcium glutamate not contaminated with calcium carbonate. The second reaction stage also can readily be made continuous in an obvious manner.

The starting materials for the first stage of the hydrolyzation process are prepared in high yields from cyanopropionaldehyde, formylpropionic acid, and the esters of the latter, and need not be isolated from the reaction mixtures in which they were formed. If these mixtures contain free ammonia, they may be subjected directly to the conditions of temperature and necessary pressure under which the hydantoin ring is broken and all ammonia and carbon dioxide present are converted to gases which are readily removed. The acyclic compounds produced in the first hydrolysis step are further processed to calcium glutamate by reaction with calcium hydroxide, milk of lime, calcium oxide, and other compounds generically referred to herein as "lime" without simultaneous precipitation of contaminants.

While the invention has been described with particular reference to specific embodiments, it is to be understood that it is not limited thereto, but is to be construed broadly and restricted solely by the scope of the appended claims.

What is claimed is:

1. A method of converting a hydantoin derivative of the formula:

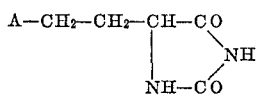

wherein A is cyano, carboxy, or carbo-lower-alkoxy to calcium glutamate which comprises:
(a) heating said hydantoin derivative with an effective amount of aqueous ammonia to a temperature higher than 100° C. until carbon dioxide is developed and the hydantoin ring of said derivative is opened;
(b) removing said carbon dioxide from the reaction mixture so obtained;
(c) heating the residual reaction mixture in the presence of lime until calcium glutamate is precipitated.

2. A method as set forth in claim 1, wherein the amount of said ammonia is between 0.1 and 5 moles per mole of said hydantoin derivative, and said temperature is above 100° C. but not substantially higher than 250° C.

3. A method as set forth in claim 2, wherein said temperature is between 170° C. and 200° C.

4. A method as set forth in claim 2, wherein the molar amount of said lime is substantially equal to that of said hydantoin derivative.

5. A method as set forth in claim 4, wherein said residual mixture is heated to a temperature not substantially lower than 50° C., nor substantially higher than 200° C.

References Cited
UNITED STATES PATENTS

| | | | |
|---|---|---|---|
| 2,557,920 | 6/1951 | White | 260—326.14 |
| 2,527,366 | 10/1950 | Livak | 260—319 |

LORRAINE A. WEINBERGER, Primary Examiner

P. J. KILLOS, Assistant Examiner

U.S. Cl. X.R.

260—309.5